Oct. 13, 1953

W. S. ERWIN 2,655,035

ULTRASONIC TRANSMISSION TESTING

Filed Aug. 24, 1949

Inventor
Wesley S. Erwin
By
Willits, Helwig & Baillio
Attorneys

Patented Oct. 13, 1953

2,655,035

UNITED STATES PATENT OFFICE 2,655,035

ULTRASONIC TRANSMISSION TESTING

Wesley S. Erwin, Detroit, Mich., assignor to General Motors Corporation, Detroit, Mich., a corporation of Delaware Application August 24, 1949, Serial No. 112,067

8 Claims. (Cl. 73—67)

The present invention relates to ultrasonic transmission testing and more particularly relates to testing apparatus with means for preventing the overloading of the ultrasonic signal receiver.

Ultrasonic transmission testing equipment is used extensively for determining flaws in metallic articles. In testing equipment of this type, it is common practice to provide a liquid capable of transmitting ultrasonic waves between a transmitter and a receiver. The article to be tested is inserted between the transmitter and receiver and the amount of energy transmitted through the article is measured. The liquid medium between the transmitter and the receiver normally will transmit energy much more readily and thus give a much larger signal at the receiver than will be the case when the article to be tested is inserted in the path of energy. Less energy will be transmitted when the article has flaws therein than when the article is a homogeneous mass containing no flaws and the operator must be able to determine if the magnitude of the energy transmitted indicates a good or a defective article. The electronic translating circuit which translates the received ultrasonic energy into electrical energy and then amplifies this energy must be designed so as to give a sensitive indication of the transmitted energy. Such a circuit tends to become overloaded and blank out when a large amount of energy is received such as is the case when there is no article present between the transmitter and receiver and all of the energy is being transmitted through the liquid bath. The operator of the equipment therefore must first insert the article to be tested between the transmitter and receiver and then wait until the apparatus has time to respond and reduce the indicated signal. It is desirable to provide a means for preventing this overloading of the receiver during the interval time when an article to be tested is not interposed between the transmitter and receiver.

It is therefore an object of the present invention to provide apparatus for ultrasonic testing of an article of manufacture.

It is a second object of the present invention to provide a means for automatically inserting between the transmitter and receiver of ultrasonic test equipment a mass having approximately the same impedance to ultrasonic waves as does the article of manufacture to be tested when said article is removed from the equipment.

It is a further object of the present invention to provide a means for preventing the overloading of the receiver of ultrasonic test equipment.

Other objects of this invention will become apparent upon reading the specification and inspection of the drawing and will be particularly pointed out in the claims.

Referring to the figures in the drawing.

Figure 1:
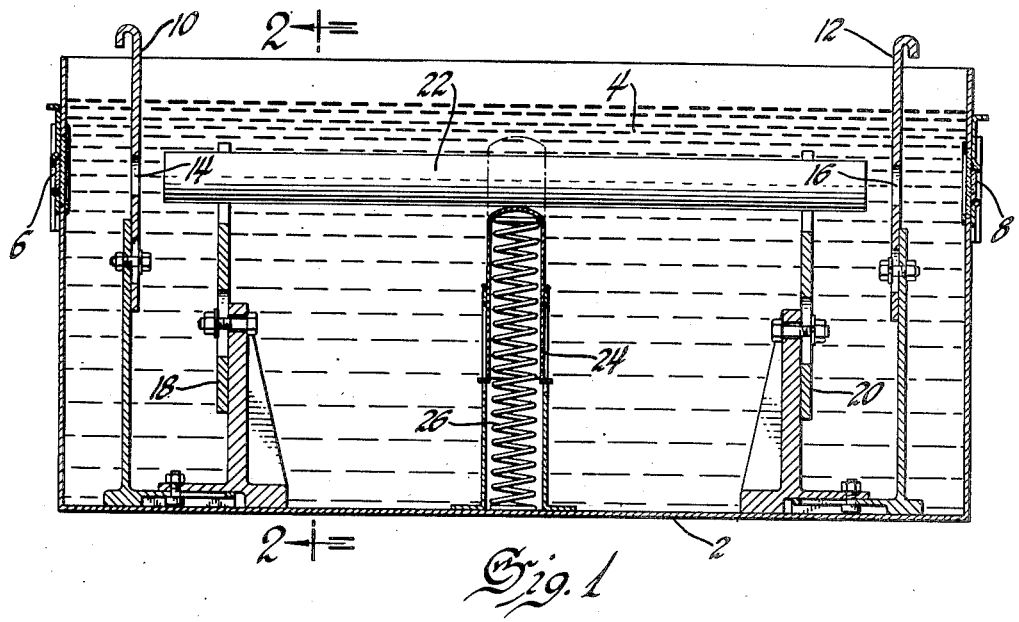
Figure 1 is a longitudinal partial sectional view of apparatus utilizing the present invention.
Figure 2:
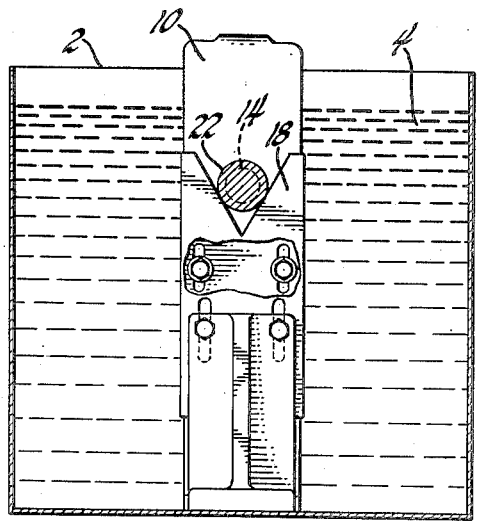
Figure 2 is a transverse partial sectional view on line 2—2 of Figure 1 of apparatus utilizing the present invention.

Referring more particularly to the figures, 2 is a container containing liquid 4 capable of transmitting ultrasonic waves. Mounted in one end of the container 2 and below the surface of the liquid 4 is an ultrasonic transducer 6 capable of translating electrical energy into mechanical energy, hereinafter called a transmitter. Located in the opposite end of the container is a second ultrasonic transducer 8 capable of translating mechanical energy into electrical energy, hereinafter called the receiver. In order to localize the ultrasonic wave into a beam of energy which may be intercepted by the article to be tested, two shields 10 and 12 are provided with openings 14 and 16 respectively therein. Supports 18 and 20 are provided for supporting the article to be tested 22 so that it intercepts the beam of ultrasonic energy being transmitted from 6 to 8. Also located between the openings 14 and 16 is a baffle 24 which obstructs the beam of ultrasonic energy when there is no article to be tested on the supports and which is pushed out of the way by the article to be tested when the article is inserted on the supports. The baffle 24 is spring biased by spring 26 and has an ultrasonic transmission characteristic approximately equal to that of the article to be tested 22 when this article has no defects therein.

From the above description it may be seen that the energy being transmitted from 6 to 8 during the interval when no article is placed on the supports 18 and 20 is approximately the same as is transmitted when an article 22 having no defects is placed thereon. If this article has defects in it, the amount of energy transmitted through the article is less than would be transmitted through the baffle 24. By using such a baffle the operator no longer has to wait for the instrument to respond to the change in electrical energy being received and thus the rapidity at which parts can be tested is increased considerably.

It is to be understood also that although the invention has been described with specific reference to a particular embodiment thereof, it is not to be so limited, since changes and alterations therein may be made which are within the full intended scope of this invention as defined by the appended claims.

I claim:

1. In an apparatus for testing articles of manufacture by ultrasonic waves, an ultrasonic wave transmitter and an ultrasonic wave receiver, a wave transmitting medium between said transmitter and said receiver providing a wave path, means for supporting the article to be tested in said wave path, a movable baffle arranged to be held out of said wave path by the article being tested when said article is positioned on said supporting means, and spring means for biasing said baffle into said path when the article is removed from said path.

2. In ultrasonic transmission testing equipment as claimed in claim 1 in which the baffle has approximately the same impedance as the article to be tested when this article has no defects.

3. In an apparatus for testing articles of manufacture by ultrasonic waves, an ultrasonic wave transmitter and an ultrasonic wave receiver, a wave transmitting medium between said transmitter and said receiver providing a wave path, means for supporting the article to be tested in said wave path, a movable baffle arranged to be held out of said wave path by the article being tested when said article is positioned on said supporting means, and resilient means for biasing said baffle into said path when the article is removed from said path.

4. In an apparatus for testing articles of manufacture by ultrasonic waves, an ultrasonic wave transmitter and an ultrasonic wave receiver, a wave transmitting liquid between said transmitter and said receiver providing a wave path, means for supporting the article to be tested in said wave path, a movable baffle arranged to be held out of said wave path by the article being tested when said article is positioned on said supporting means, and spring means for biasing said baffle into said path when the article is removed from said path.

5. In an apparatus for testing articles of manufacture by ultrasonic waves, an ultrasonic wave transmitter and an ultrasonic wave receiver, a wave transmitting medium between said transmitter and said receiver providing a wave path, an apertured baffle disposed adjacent one end of the article to be tested for localizing the ultrasonic wave path, means for supporting the article to be tested in said wave path, a movable baffle arranged to be held out of said wave path by the article being tested when said article is positioned on said supporting means, and spring means for biasing said movable baffle into said path when the article is removed from said path.

6. In an apparatus for testing articles of manufacture by ultrasonic waves, an ultrasonic wave transmitter and an ultrasonic wave receiver, a wave transmitting medium between said transmitter and said receiver providing a wave path, apertured baffles disposed adjacent to the ends of the article to be tested for localizing the ultrasonic wave path, means for supporting the article to be tested in said wave path, a movable baffle arranged to be held out of said wave path by the article being tested when said article is positioned on said supporting means, and spring means for biasing said movable baffle into said path when the article is removed from said path.

7. An apparatus according to claim 6 in which the apertured baffles for localizing the ultrasonic wave path comprise two baffle plates located between said transmitter and receiver at opposite ends of the article to be tested, said baffle plates having apertures therein arranged to localize the path of ultrasonic waves through the article to be tested.

8. In an apparatus for testing articles of manufacture by ultrasonic waves, an ultrasonic wave transmitter, an ultrasonic wave receiver, a wave transmitting liquid between said transmitter and said receiver providing a wave path, apertured baffles between said transmitter and receiver for localizing the path of ultrasonic waves, means for supporting the article to be tested between said baffles in said wave path, a movable baffle, having approximately the same impedance to ultrasonic waves as the article to be tested, arranged to be held out of said wave path by the article being tested when said article is positioned on said supporting means, and spring means for biasing said baffle into said path when the article is removed from said path.

WESLEY S. ERWIN.

References Cited in the file of this patent

UNITED STATES PATENTS

| Number | Name | Date |
| --- | --- | --- |
| 2,411,537 | Goodale | Nov. 26, 1946 |
| 2,448,352 | Carlin | Aug. 31, 1948 |

OTHER REFERENCES

Book entitled Ultrasonics by Benson Carlin, published by McGraw-Hill, April 8, 1949, page 96.